United States Patent
Andersson et al.

(10) Patent No.: US 9,191,822 B2
(45) Date of Patent: Nov. 17, 2015

(54) DEVICE-INITIATED SECURITY POLICY

(75) Inventors: Stefan Mikael Andersson, Klågerup (SE); Mats Göran Pettersson, Sövde (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1284 days.

(21) Appl. No.: 11/684,266

(22) Filed: Mar. 9, 2007

(65) Prior Publication Data

US 2008/0222692 A1 Sep. 11, 2008

(51) Int. Cl.
*H04W 12/12* (2009.01)
*G06F 21/88* (2013.01)
*G06F 21/33* (2013.01)
*H04L 29/06* (2006.01)
*H04W 88/02* (2009.01)

(52) U.S. Cl.
CPC .............. *H04W 12/12* (2013.01); *G06F 21/33* (2013.01); *G06F 21/88* (2013.01); *H04L 63/102* (2013.01); *H04L 63/20* (2013.01); *H04W 88/02* (2013.01)

(58) Field of Classification Search
CPC ........ H04W 12/12; G06F 21/88; G06F 21/33; G06F 2221/2111; H04L 63/20; H04L 63/102
USPC .............. 726/1, 3, 7, 19, 27, 34, 35; 713/155, 713/183; 380/247; 455/410, 411
See application file for complete search history.

(56) References Cited

U.S. PATENT DOCUMENTS

| | | | | |
|---|---|---|---|---|
| 6,504,480 | B1 * | 1/2003 | Magnuson et al. | 340/571 |
| 7,437,752 | B2 * | 10/2008 | Heard et al. | 726/1 |
| 7,809,353 | B2 * | 10/2010 | Brown et al. | 455/410 |
| 7,890,083 | B2 * | 2/2011 | Chandran | 455/411 |
| 8,233,882 | B2 * | 7/2012 | Rogel | 455/411 |
| 8,542,833 | B2 * | 9/2013 | Devol et al. | 380/259 |
| 2003/0005316 | A1 * | 1/2003 | Girard | 713/193 |
| 2003/0115474 | A1 * | 6/2003 | Khan et al. | 713/186 |
| 2003/0126462 | A1 * | 7/2003 | Howard et al. | 713/200 |
| 2004/0073786 | A1 * | 4/2004 | O'Neill et al. | 713/155 |
| 2004/0234056 | A1 * | 11/2004 | Heilmann et al. | 379/196 |
| 2005/0020315 | A1 * | 1/2005 | Robertson | 455/565 |
| 2005/0044404 | A1 * | 2/2005 | Bhansali et al. | 713/200 |

(Continued)

FOREIGN PATENT DOCUMENTS

DE 102 35 962 A1 10/2003
EP 1 659 818 A1 5/2006

(Continued)

OTHER PUBLICATIONS

Safavi-Naini, Rei, Willy Susilo, and Gelareh Taban. "Towards securing 3G mobile phones." Networks, 2001. Proceedings. Ninth IEEE International Conference on. IEEE, 2001: (pp. 222-227).*

(Continued)

*Primary Examiner* — Kari Schmidt
(74) *Attorney, Agent, or Firm* — James C. Edwards; Moore & Van Allen PLLC

(57) ABSTRACT

A method and system for executing a security policy at a mobile terminal is provided. The mobile terminal may contact an authentication entity based on the security policy. The mobile terminal may receive a response from the authentication entity indicative of a security status of the mobile terminal. The mobile terminal may execute a security action based on the received response.

32 Claims, 4 Drawing Sheets

(56) References Cited

U.S. PATENT DOCUMENTS

| | | | | |
|---|---|---|---|---|
| 2005/0166263 | A1* | 7/2005 | Nanopoulos et al. | 726/7 |
| 2005/0204405 | A1* | 9/2005 | Wormington et al. | 726/27 |
| 2006/0036781 | A1* | 2/2006 | Thacker | 710/36 |
| 2006/0161628 | A1* | 7/2006 | Nagy et al. | 709/206 |
| 2006/0180658 | A1* | 8/2006 | Anderson | 235/380 |
| 2006/0224742 | A1* | 10/2006 | Shahbazi | 709/226 |
| 2006/0224901 | A1* | 10/2006 | Lowe | 713/186 |
| 2006/0236364 | A1* | 10/2006 | Suni et al. | 726/1 |
| 2006/0288234 | A1* | 12/2006 | Azar et al. | 713/186 |
| 2007/0038680 | A1 | 2/2007 | Casey | |
| 2007/0138999 | A1* | 6/2007 | Lee et al. | 320/107 |
| 2007/0266422 | A1* | 11/2007 | Germano et al. | 726/1 |
| 2008/0005561 | A1* | 1/2008 | Brown et al. | 713/164 |
| 2008/0229428 | A1* | 9/2008 | Camiel | 726/27 |

FOREIGN PATENT DOCUMENTS

| | | | | |
|---|---|---|---|---|
| GB | 2 389 004 | * | 11/2003 | H04Q 7/32 |
| WO | WO 2006/125112 | A2 | 11/2006 | |

OTHER PUBLICATIONS

Ravi, Srivaths, Anand Raghunathan, and Nachiketh Potlapally. "Securing wireless data: system architecture challenges." Proceedings of the 15th international symposium on System Synthesis. ACM, 2002: (pp. 195-200).*

International Search Report and Written Opinion dated Sep. 3, 2008 issued in corresponding international application No. PCT/IB2007/053625, 12 pages.

European Patent Office; Communication pursuant to Article 94(3) EPC; Feb. 13, 2013; issued in European Patent Application No. 07 826 314.2.

European Patent Office; Communication Pursuant to Article 94(3) EPC; Jan. 26, 2015; issued in European Patent Application No. 07826314.2.

* cited by examiner

DEVICE-INITIATED SECURITY POLICY

TECHNICAL FIELD OF THE INVENTION

The invention relates generally to the operation of mobile communication devices and, more particularly, to implementing security policies in mobile communication devices.

DESCRIPTION OF RELATED ART

Mobile communication devices, such as cellular telephones, have become increasingly ubiquitous and useful. Additionally, the types of applications and information used and maintained on such devices have increased exponentially over recent years. It is not uncommon for a particular mobile communication device to maintain listings of contact information for hundreds of individuals, data files, such as word processing documents, spreadsheets, photographs, audio files, etc., configuration and security information, such as network access settings and password information, etc.

Unfortunately, the relatively small size of these devices as well as their high value (for both monetary and privacy/security reasons) make such devices increasingly susceptible to loss and/or theft. Additionally, a device may be moved temporarily or permanently out of a coverage area. In the event of such a loss, it may be desirable to limit device operation or remove sensitive information from the device. Existing methodologies for interacting with lost or stolen devices typically require transmitting instructions to the device via the device's known contact information (i.e., the telephone number associated with the device). However, in the event that contact information associated with the device has been changed, such as by replacement of a subscriber identity module (SIM) card associated with the device, these methodologies may prove ineffective.

SUMMARY

According to one aspect, a method for executing a security policy at a mobile terminal may include contacting an authentication entity based on the security policy; receiving a response from the authentication entity indicative of a security status of the mobile terminal; and executing a security action based on the received response.

Additionally, the contacting the authentication entity may further include periodically contacting the authentication entity.

Additionally, the periodically contacting the authentication entity may further include contacting the authentication entity following every passage of a predetermined period of time.

Additionally, the periodically contacting the authentication entity may further include contacting the authentication entity following a predetermined number of events.

Additionally, the contacting the authentication entity may further include determining whether a predetermined event has occurred and contacting the authentication entity when it is determined that the predetermined event has occurred.

Additionally, the predetermined event may include one of: access to a predetermined portion of a memory of mobile terminal, replacement of a SIM card associated with the mobile terminal, or updating a firmware or software associated with the mobile terminal.

Additionally, the method may include determining whether a correct code has been received, and contacting the authentication entity when it is determined that the correct code has not been received.

Additionally, the contacting may include contacting via a wireless network.

Additionally, the wireless network may include one of: an 802.11 wireless data network (WiFi), a wireless USB network, or a Bluetooth network.

Additionally, the contacting may include manually contacting a call center associated with the authentication entity.

Additionally, the authentication entity may maintain a security status of the mobile device.

Additionally, receiving a response from the authentication entity indicative of a security status of the mobile terminal may further include receiving security instructions defining the security action to be executed by the mobile terminal.

Additionally, the security action may be executed when the response from the authentication entity indicates that the status of the mobile terminal is one of lost or stolen.

Additionally, the security action may include at least one of: deleting predetermined files on the mobile terminal, deleting a predetermined folder on the mobile terminal, deleting configuration settings on the mobile terminal, transmitting a location of the mobile terminal to the authentication entity, locking the mobile terminal, or performing a reset of the mobile terminal.

Additionally, the security action may be defined by the security policy.

Additionally, the method may include configuring the security policy during manufacture of the mobile terminal.

Additionally, the method may include configuring the security policy by an owner of the mobile terminal.

Additionally, the method may include configuring the security policy by a user of the mobile terminal Another aspect is directed to a mobile terminal. The mobile terminal may include logic configured to determine whether a triggering criteria has occurred; a transmitter configured to contact an authentication entity when it is determined that the triggering criteria has occurred; logic configured to receive a response from the authentication entity indicating that the mobile terminal has been lost or stolen; and logic configured to execute a command based on the received response.

Additionally, the triggering criteria may include one of: passage of a predetermined period of time, occurrence of a predetermined number of events, a location of the terminal, or occurrence of a predetermined single event.

Additionally, the transmitter configured to contact the authentication entity may include a transmitter configured to contact the authentication entity via a wireless network.

Additionally, the authentication entity may be associated with a carrier for the mobile terminal.

Additionally, the authentication entity may be associated with an owner of the mobile terminal.

Additionally, the logic configured to execute a command based on the received response may further include logic configured to perform one of: deleting predetermined files on the mobile terminal, deleting a predetermined folder on the mobile terminal, deleting configuration settings on the mobile terminal, transmitting a location of the mobile terminal to the authentication entity, locking the mobile terminal, or performing a reset of the mobile terminal based on the receive response.

Another aspect is directed to a method including receiving notice that a mobile terminal has been lost or stolen; receiving a check-in from the mobile terminal; and transmitting security action instructions to the mobile terminal.

Additionally, the transmitting security action instructions may further include transmitting instructions for performing one of: deleting predetermined files on the mobile terminal, deleting a predetermined folder on the mobile terminal, deleting configuration settings on the mobile terminal, transmitting a location of the mobile terminal to the authentication entity, locking the mobile terminal, or performing a reset of the mobile terminal.

Yet another aspect is directed to a security system including an authentication entity and a mobile terminal operatively connected to the authentication entity via a network, where the authentication entity may be configured to maintain a security status for the mobile terminal, where the mobile terminal may be configured to contact the authentication entity regarding the security status of the mobile terminal, where the authentication entity may be configured to transmit an indication of the security status to the mobile terminal, and where the mobile terminal may be configured to execute a security action in response to the received indication.

Additionally, the network may include a cellular network.

Additionally, the network may include a data network.

Additionally, the data network may include one of a 802.11 wireless data network (WiFi), a Bluetooth network, or a wireless USB network.

Additionally, the mobile terminal may be configured to contact the authentication entity upon occurrence of a triggering event.

Additionally, the indication of the security status may include instructions for executing the security action.

It should be emphasized that the term "comprises/comprising" when used in this specification is taken to specify the presence of stated features, integers, steps, components or groups but does not preclude the presence or addition of one or more other features, integers, steps, components or groups thereof.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description refers to the accompanying drawings. The same reference numbers in different drawings identify the same or similar elements. Also, the following detailed description does not limit the invention. Instead, the scope of the invention is defined by the appended claims and equivalents.

Exemplary Electronic Device

Figure 1:
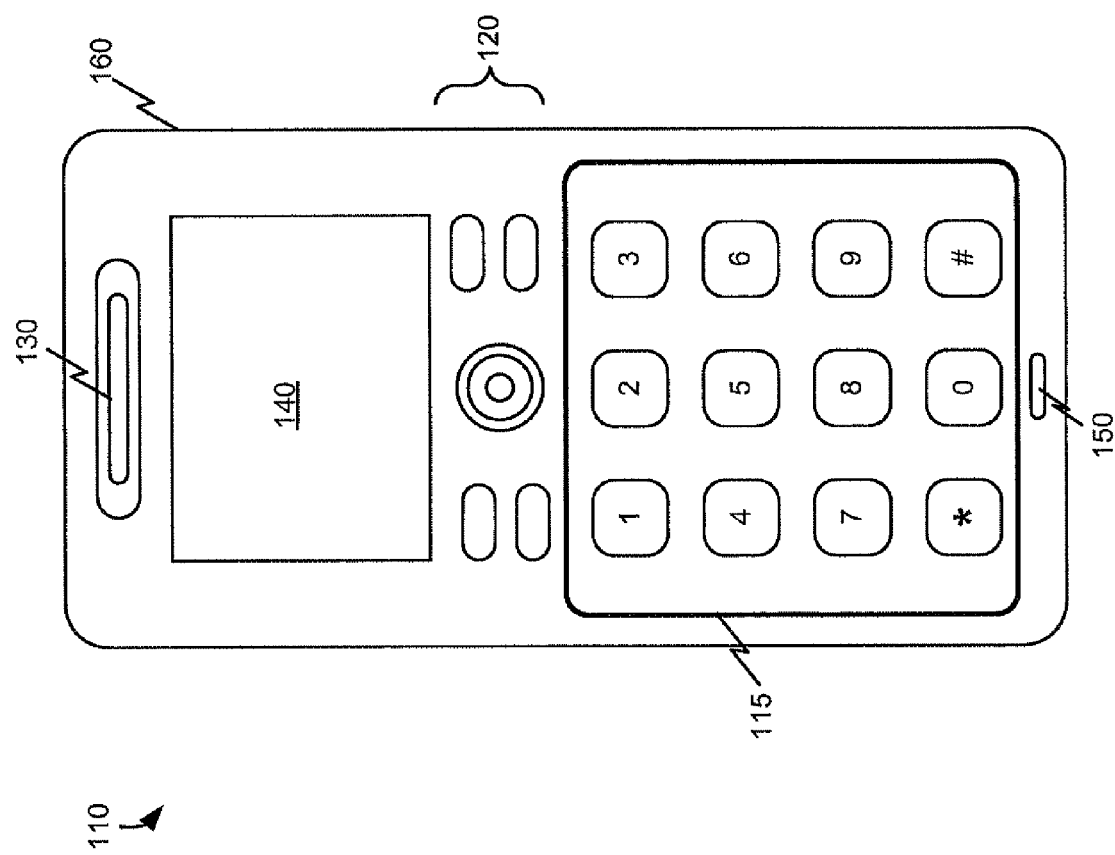
FIG. 1 is a diagram of an exemplary electronic device.

FIG. 1 is a diagram of an exemplary implementation of an electronic device 110 consistent with the aspects described herein. In one exemplary implementation, electronic device 110 can be any type of portable electronic device. For example, device 110 may include a personal computer, a telephone, a cellular radiotelephone, a Personal Communications System (PCS) terminal, a personal digital assistant (PDA), a conventional laptop and/or palmtop receiver, or the like. A PCS terminal may combine a cellular radiotelephone with data processing, facsimile and/or data communications capabilities. A PDA may include a radiotelephone, a pager, Internet/intranet access, a web browser, an organizer, calendars and/or a global positioning system (GPS) receiver. Electronic device 110 may further be referred to as a "pervasive computing" device.

Electronic device 110 may include a keypad 115, control keys 120, a speaker 130, a display 140, a microphone 150 and a housing 160. Housing 160 may include a structure configured to hold devices and components used in device 110. For example, housing 160 may be formed from plastic, metal, or a composite material and may be configured to support keypad 115, control keys 120, speaker 130, display 140 and microphone 150.

Keypad 115 may include devices and/or logic that can be used to operate electronic device 110. Keypad 115 may further be adapted to receive user inputs, directly or via other devices, such as via a stylus for entering information into electronic device 110. In one implementation, communication functions of electronic device 110 may be controlled by activating keys in keypad 115. The keys may have key information associated therewith, such as numbers, letters, symbols, etc. The user may operate keys in keypad 115 to place calls, enter digits, commands, and text messages, into electronic device 110. Designated functions of keys may form and/or manipulate images that may be displayed on display 140.

Control keys 120 may include buttons that permit a user to interact with communication device 110 to cause communication device 110 to perform specified actions, such as to interact with display 140, etc.

Speaker 130 may include a device that provides audible information to a user of electronic device 110. Speaker 130 may be located anywhere on electronic device 110 and may function, for example, as an earpiece when a user communicates using electronic device 110. Speaker 130 may also include a digital-to-analog converter to convert digital signals into analog signals. Speaker 130 may also function as an output device for a ringing signal indicating that an incoming call is being received by communication device 110.

Display 140 may include a device that provides visual images to a user. For example, display 140 may provide graphic information regarding incoming/outgoing calls, text messages, games, phonebooks, the current date/time, volume settings, etc., to a user of electronic device 110. Implementations of display 140 may be implemented as black and white or color flat panel displays.

Microphone 150 may include a device that converts speech or other acoustic signals into electrical signals for use by electronic device 110. Microphone 150 may also include an analog-to-digital converter to convert input analog signals into digital signals. Microphone 150 may be located anywhere on electronic device 110 and may be configured, for example, to convert spoken words or phrases into electrical signals for use by electronic device 110.

Figure 2:
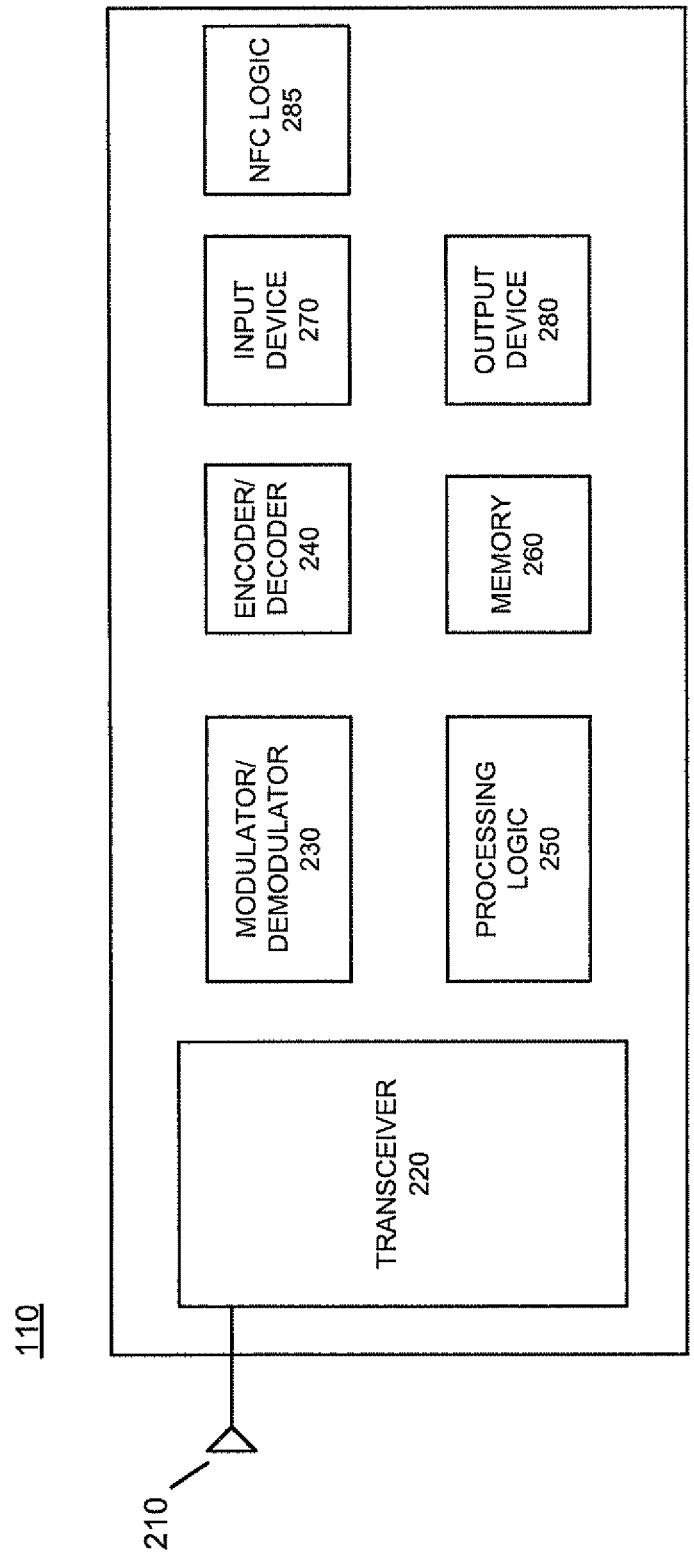
FIG. 2 is a diagram illustrating additional details of the exemplary electronic device shown in FIG. 1.

FIG. 2 is a diagram illustrating additional exemplary details of device 110 according to an exemplary implementation. Electronic device 110 may include a radio frequency (RF) antenna 210, transceiver 220, modulator/demodulator 230, encoder/decoder 240, processing logic 250, memory 260, input device 270, output device 280, and near field communication (NFC) logic 285. These components may be connected via one or more buses (not shown). In addition, electronic device 110 may include one or more power supplies (not shown). Electronic device 110 may be configured in a number of other ways and may include other or different elements.

RF antenna 210 may include one or more antennas capable of transmitting and receiving RF signals. In one implementation, RF antenna 210 may include one or more directional and/or omni-directional antennas. Transceiver 220 may include circuitry capable of transmitting and receiving data and control signals via RF antenna 210 using a wireless communications protocol such as a cellular radiotelephone protocol (e.g., GSM (global system for mobile communications), PCS (personal communication services), FDMA (frequency division multiple access), CDMA (code division multiple access), TDMA (time division multiple access), UMTS (universal mobile telecommunications system) etc.). In additional implementations, transceiver 220 may use short distance wireless communication protocols such as the Bluetooth protocol, one or more of the IEEE 802.11 protocols, the WiMax protocol, the Ultra Wideband protocol, or any other suitable wireless communication protocol. In an alternative implementation, transceiver 220 may take the form of separate transmitter and receiver components, instead of being implemented as a single component.

Modulator/demodulator 230 may include components that combine data signals with carrier signals and extract data signals from carrier signals. Modulator/demodulator 230 may include components that convert analog signals to digital signals, and vice versa, for communicating with other devices in electronic device 110.

Encoder/decoder 240 may include circuitry for encoding a digital input to be transmitted and for decoding a received encoded input. Processing logic 250 may include a processor, microprocessor, an application specific integrated circuit (ASIC), field programmable gate array (FPGA) or the like. Processing logic 250 may execute software programs or data structures to control operation of electronic device 110. Memory 260 may include a random access memory (RAM) or another type of dynamic storage device that stores information and instructions for execution by processing logic 250; a read only memory (ROM) or another type of static storage device that stores static information and instructions for use by processing logic 250; and/or some other type of magnetic or optical recording medium and its corresponding drive. Instructions used by processing logic 250 may also, or alternatively, be stored in another type of computer-readable medium accessible by processing logic 250. A computer-readable medium may include one or more memory devices.

Input device 270 may include any mechanism that permits an operator to input information to electronic device 110, such as microphone 150 or keypad 115. Output device 280 may include any mechanism that outputs information to the operator, including display 140 or speaker 130. Output device 280 may also include a vibrator mechanism that causes electronic device 110 to vibrate.

NFC logic 285 may provide an additional input mechanism for input device 270. NFC logic 285 is generally used to sense user input to electronic device 110 based on the location of electronic device 110 relative to other NFC-enabled devices. NFC logic 285 may implement the known near field communication (NFC) protocol.

NFC logic 285 may include circuitry for communicating with other devices using the NFC protocol. The NFC protocol is a short-range wireless connectivity standard that uses magnetic field induction to enable communication between devices when they are touched together or brought within a few centimeters of each other (e.g., approximately three centimeters or less). NFC includes a passive communication mode in which, when two devices are communicating, one of the two may be a passive device that not require a power supply. Instead, the passive NFC device may receive a carrier field from another device and use the power from that carrier field to transmit information back to the other device. In alternate implementations, instead of using the NFC protocol to interact with other devices, electronic device 110 may use radio frequency identification (RFID) techniques to interact with or receive information from other devices that include RFID tags.

Electronic device 110 may perform processing associated with, for example, operation of the core features of electronic device 110 or operation of additional applications associated with electronic device 110, such as software applications provided by third party software providers. Electronic device 110 may perform this processing in response to processing logic 250 executing sequences of instructions contained in a computer-readable medium, such as memory 260. It should be understood that a computer-readable medium may include one or more memory devices. Execution of sequences of instructions contained in memory 260 causes processing logic 250 to perform acts that will be described hereafter. In alternative embodiments, hard-wired circuitry may be used in place of or in combination with software instructions to implement processes consistent with the invention. Thus, implementations described herein are not limited to any specific combination of hardware circuitry and software.

Exemplary System

Figure 3:
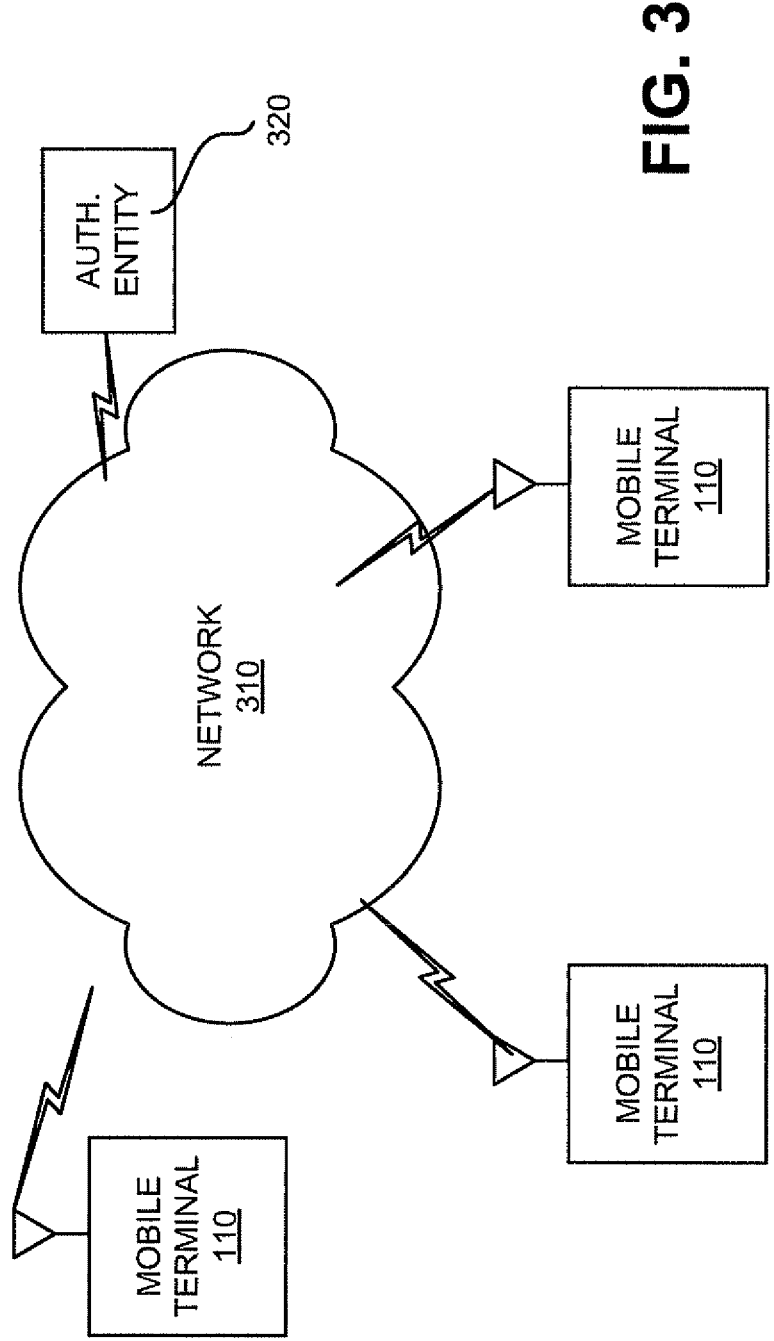
FIG. 3 is an exemplary diagram of a communications system in which multiple electronic devices of FIG. 1 may be incorporated.

FIG. 3 is an exemplary diagram of a communications system 300 in which multiple devices 110 may be incorporated. In addition to mobile terminals 110, system 300 may include a network 310 (e.g., a cellular network, a PSTN, the Internet, a WAN, a LAN, a wireless data network, such as 802.11x, etc.) and an authentication entity 320 associated with network 310.

Consistent with aspects described herein, authentication entity 320 may maintain a listing indicating the lost or stolen status of mobile terminals 110. Mobile terminals 110 may be configured to execute a security policy causing the terminals to actively check-in with authentication entity 320. In one implementation, such an active check-in may be performed on a periodic basis. Alternatively, the check-in may result from certain activities or events performed on or by mobile terminals 110.

At the time of check-in, authentication entity 320 may determine whether the checking-in electronic device 110 has been reported as lost or stolen. When it is determined that electronic device 110 has been reported as lost or stolen, authentication entity 320 may cause certain actions to be performed on electronic device 110. For example, authentication entity 320 may cause the deletion of files, including contact information, configuration information, passwords, keys, etc. Alternatively, authentication entity 320 may cause the electronic device 110 to become locked from future use or to transmit its location to authentication entity 320 when possible.

By providing for execution of a security policy supporting active an check-in with an authentication entity, loss of valuable data and/or mobile terminals containing the data may be prevented or reduced. Because the check-in is initiated by the mobile terminal, reset of the terminal or removal/replacement of user-specific components, such as, for example, SIM cards or the like, does not prevent the execution of the policy.

Exemplary Processing

Consistent with aspects described herein, electronic device 110 may actively contact authentication entity 320 based on a predetermined security policy to authenticate or validate ownership and possession of electronic device 110. Depending on information maintained at authentication entity 320, security measures relating to mobile device 110 may be enforced.

Figure 4:
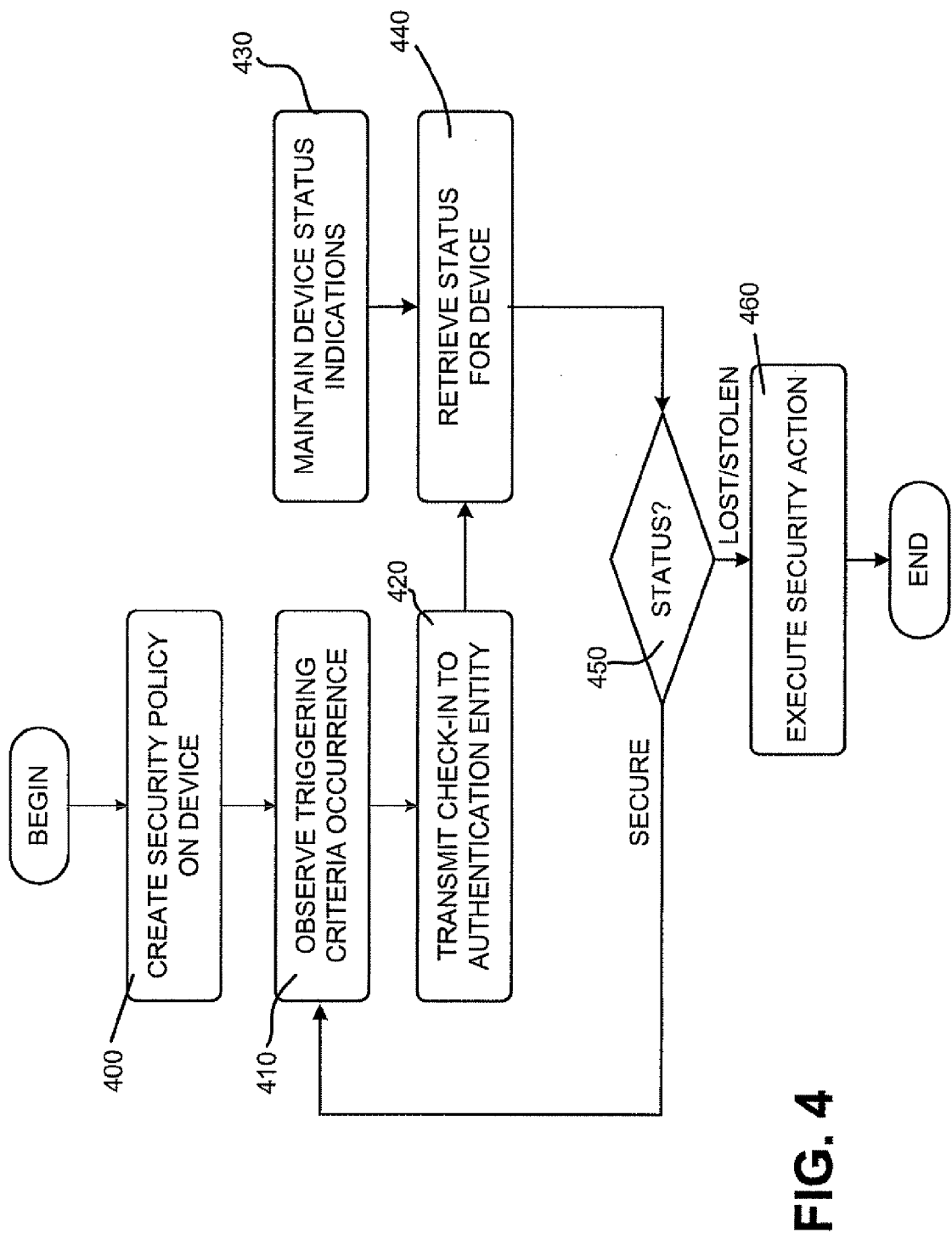
FIG. 4 is a flow chart illustrating exemplary processing for implementing a security policy on an electronic device of FIG. 1.

FIG. 4 is a flow chart illustrating exemplary processing for implementing a security policy within device 110. Processing may begin with creation or establishment of a security policy on device 110 (block 400). In one exemplary embodiment, establishment of the security policy may be performed by a manufacturer, carrier, or operator associated with electronic device 110. In another embodiment, the security policy may be established by an owner (e.g., a corporation, government body, company, division, etc.) of electronic device 110. In still another exemplary embodiment, the security policy may be established by a user of electronic device 110.

In one exemplary implementation, the security policy may be maintained on memory 250 (e.g., a ROM memory) and executed by processing logic 250 in a manner set forth in additional detail below. In one embodiment, the security policy may be stored on memory 250 during manufacture of electronic device 110. In another embodiment, the security policy may be configured and stored on memory 250 subsequent to manufacture. For example, the security policy may be configured and stored on electronic device 110 during carrier branding and/or locking of electronic device 110. Alternatively, the security policy may be configured and stored on electronic device 110 following purchase of electronic device 110, but prior to dissemination of mobile device 110 to an end user. In still another implementation, the security policy may be configured and stored on electronic device 110 by the end user. In one exemplary embodiment, the security policy may be maintained in a protected portion of memory 250, thereby preventing deletion or loss of the policy prior to or during execution, such as in response to a reset of electronic device 110.

In one exemplary post-manufacture embodiment, the security policy may be configured and executed via an operating system running on electronic device 110 and executed by processing logic 250. In this embodiment, the operating system may provide a suitable interface for receiving the security policy rules. For example, a menu-driven display may be provided on display 140. In one example, the interface may be protected against unauthorized use, such as via password protection, biometric interrogation, or any other suitable authentication mechanism. In another implementation consistent with aspects described herein, the security policy may be pushed or transmitted to electronic device 110 via text message or other transmission interface. In this implementation, a received policy message may be executed or accepted by user. Alternatively, the received policy message may be executed and initiated in a manner transparent to the user.

Following configuration and execution of the security policy, processing logic 250 may determine that one or more triggering criteria has occurred (block 410). When one of the triggering criteria has occurred, electronic device 110 may "check-in" with authentication entity 320 (block 420). In one exemplary implementation, the checking-in may be performed via any suitable network, such as a cellular network or wireless data network (e.g., 802.11 (WiFi), wireless USB, bluetooth, 3G, 3.5G, 4G, etc.). Alternatively, the checking-in may be performed by manually placing a voice call to a call center associated with authentication entity 320. In this embodiment, the user may be queried for an authorization or access code and may receive a verbal response from the call center.

It may then be determined whether mobile device 110 has successfully contacted authentication entity 320 (block 425). If not, the process may proceed directly to block 460 described below, for execution of a security action. Alternatively, the process may end and a counter of unsuccessful attempts may be incremented. In the event that a predetermined number of unsuccessful attempts have been made, the security action may be executed.

The triggering criteria may include a passage of a predetermined time interval. For example, mobile device 110 may contact authentication entity 320 once every 24 hours. In another implementation, the triggering criteria may include a monitored counter value or predetermined number of events or actions. For example, electronic device 110 may contact authentication entity 320 once every five starts of electronic device 110. In still another implementation, the triggering criteria may include user access or attempted access to a predetermined storage location on electronic device 110. In yet another implementation, the triggering criteria may include modification of a portion of electronic device 110, such as a SIM card, or by updating a firmware or software associated with the mobile terminal. In still another exemplary implementation, the triggering criteria may include a failure to receive a proper response within a predetermined time period or for a predetermined number of times. For example, mobile device 110 may be configured to periodically query a user for a proper code. Failure to enter a correct code may trigger contacting the authentication entity. In another implementation, a user may be given N (e.g., 5) times to enter a correct code. Upon a $5^{th}$ failure, the authentication entity may be contacted. In yet another embodiment, the triggering criteria may include mobile device 110 being out of a coverage area for a predetermined period of time.

Consistent with aspects described herein, authentication entity 320 may maintain an indicating regarding a current security status of electronic device 110 (block 430). For example, each electronic device 110 associated with authentication entity 320 may be associated with one of a "secure" status, a "lost" status, or a "stolen" status. In one exemplary embodiment, the security status of mobile device 110 may be associated with a unique device identification associated with mobile device 110. Further, the security status of electronic device 110 may be received by authentication entity 320. In one example, a user or owner of device 110 may notify authentication entity 320 regarding a potential loss or theft of the device.

Upon check-in of electronic device 110 in block 420, authentication entity 320 may retrieve the current security status associated with electronic device 110 (block 440). It may then be determined whether the current security status indicates a secure mobile terminal or a lost/stolen mobile terminal (block 450). If it is determined that the security status of electronic device 110 is secure, processing may return to block 410.

However, if it is determined that the security status of electronic device 110 is either lost or stolen, a security action may be executed on electronic device 110 (block 460). The security action may be set during configuration of the security policy in block 400. Alternatively, the security action may be established and/or updated at the discretion of the entity responsible for security on electronic device 110. For example, a corporate owner of electronic device 110 may initially establish a security policy on electronic device 110. Subsequent to or contemporaneously with the establishment of the security policy, the corporate owner may provide or update the security action. The security action may be updated from time to time, without requiring reconfiguration of the security policy.

Exemplary security actions may include deleting predetermined files or directories on electronic device 110, deleting configuration settings (e.g., virtual private network (VPN), or email, or other access configuration settings), transmitting a location of electronic device 110 to authentication entity 320 via, for example, SMS (using, for example, a global positioning satellite (GPS) receiver or other suitable location mechanisms), locking or otherwise rendering inoperable electronic device 110 or portions of electronic device 110, and performing a reset or master reset of electronic device 110.

Based on the manner of implementing the security policy on electronic device 110, execution of the security action or actions may be performed transparently with respect to a user of electronic device 110. Alternatively, execution of the security actions may be executed with notice to the user of the actions being performed. Still alternately, users of electronic device 110 may be provided with the opportunity to prevent execution of the security actions. For example, upon determining that the security status of mobile terminal is set as lost or stolen, the user of electronic device 110 may be authenticated in any suitable manner, such as password or passcode entry or biometric interrogation. If authentication is successfully performed, the security actions may not be executed. Otherwise, the established security action may be executed in the manner described above.

In one implementation, executing a security action may include receiving security instructions from authentication entity 320 via transceiver 220. Upon receipt of the security instruction, electronic device 110 may execute the instructions in a manner consistent with the established security policy. In an alternative implementation, electronic device 110 may receive a security status indicator from authentication entity 320. Electronic device 110 may execute security actions maintained on electronic device 110 and associated with the received security status indicator as established in the security policy. In this implementation, all details of the security action may be maintained on electronic device 110.

CONCLUSION

As described above, a mobile terminal may be configured to actively check-in with an authentication entity. In the event that the mobile terminal has been reported as lost or stolen to the authentication entity, established security actions may be executed on the mobile terminal.

The foregoing description of exemplary embodiments provides illustration and description, but is not intended to be exhaustive or to limit exemplary embodiments to the precise form disclosed. Modifications and variations are possible in light of the above teachings or may be acquired from practice of the invention.

Further, while a series of acts has been described with respect to FIG. 4, the order of the acts may be varied in other implementations consistent with the invention. Moreover, non-dependent acts may be performed in parallel.

It will also be apparent to one of ordinary skill in the art that aspects of the invention, as described above, may be implemented in cellular communication devices/systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A method for executing a security policy at a mobile terminal, the method comprising:
   determining, by the mobile terminal, whether a predetermined event has occurred, wherein the predetermined event comprises either one of (i) a lapse of a predetermined time interval, or (ii) a predetermined number starts of the mobile device;
   in response to determining the predetermined event occurred, contacting, by the mobile terminal, an authentication entity, based on the security policy, to determine whether a security status of the mobile terminal is one of lost or stolen;
   receiving, by the mobile terminal, a response from the authentication entity indicative of the security status of the mobile terminal, in response to contacting the authentication entity, the response from the authentication entity indicating that the security status of the mobile terminal is one of lost or stolen, the response comprising security instructions defining a security action for execution on the mobile terminal, the security action comprising an authentication procedure, transmitting a location of the mobile terminal to the authentication entity, and, subsequent to transmitting the location rendering a portion of the mobile terminal inoperable for use;
   upon determining the security status of the mobile terminal is one of lost or stolen, executing, by the mobile terminal, performance of the authentication procedure by a user as defined by the security action;
   upon determining successful performance of the authentication procedure by the user of the mobile terminal:
   preventing the execution of (a) transmitting the location of the mobile terminal to the authentication entity and (b) rendering the portion of the mobile terminal inoperable for use; and
   setting the security status of the mobile terminal to secure; and
   upon determining unsuccessful performance of the authentication procedure by the user of the mobile terminal:

transmitting, by the mobile terminal, a Short Message Service (SMS) message to the authentication entity that includes the location of the mobile terminal, wherein the message is transmitted transparently with respect to the user of the mobile communication device; and subsequent to transmitting the SMS message, rendering the portion of the mobile terminal inoperable for use.

2. The method of claim 1, where contacting the authentication entity further comprises:
periodically contacting the authentication entity based on the lapse of the predetermined time interval.

3. The method of claim 2, where the periodically contacting the authentication entity further comprises:
contacting the authentication entity following every lapse of the predetermined period of time.

4. The method of claim 2, where the periodically contacting the authentication entity further comprises:
contacting the authentication entity following a predetermined number of events.

5. The method of claim 1, where the predetermined event further comprises one or more of: accessing a predetermined portion of a memory of the mobile terminal, detecting replacement removal of a subscriber identity module (SIM) card associated with the mobile terminal, or detecting an update of a firmware or software associated with the mobile terminal, the method further comprising:
determining that the predetermined event has occurred when one of the access to the predetermined portion of a memory of the mobile terminal is detected, the replacement removal of the SIM card associated with the mobile terminal is detected, or the update of the firmware or the software associated with the mobile terminal is detected.

6. The method of claim 1, where the predetermined event further comprises:
periodically prompting a user of the mobile terminal for a code;
determining, in response to periodically prompting the user, whether the code has been received from the user; and
determining that the predetermined event has occurred when the code has not been received from the user, and
contacting the authentication entity further comprises contacting the authentication entity, when the code has not been received from the user, to determine whether the security status of the mobile terminal is one of lost or stolen, and
receiving the response further comprises receiving the response, from the authentication entity, indicating that the security status of the mobile terminal is one of lost or stolen, in response to contacting the authentication entity when the code has not been received from the user.

7. The method of claim 1, where the contacting comprises contacting via a wireless network.

8. The method of claim 7, where the wireless network comprises one of: an 802.11 wireless data network (WiFi), a wireless universal serial bus (USB) network, or a bluetooth network.

9. The method of claim 1, where the contacting comprises manually contacting a call center associated with the authentication entity.

10. The method of claim 1, where the authentication entity maintains a security status of the mobile terminal.

11. The method of claim 1, where the security action further comprises locking the mobile terminal.

12. The method of claim 1, where the security action further comprises at least one of: locking the mobile terminal, deleting a predetermined folder, of a plurality of folders, on the mobile terminal, deleting predetermined files on the mobile terminal, deleting configuration settings on the mobile terminal, rendering the mobile terminal inoperable, or performing a reset of the mobile terminal.

13. The method of claim 1, where the security action is defined by the security policy.

14. The method of claim 1, further comprising: configuring the security policy during manufacture of the mobile terminal.

15. The method of claim 1, further comprising: configuring the security policy by an owner of the mobile terminal.

16. The method of claim 1, further comprising: configuring the security policy by a user of the mobile terminal.

17. A mobile terminal comprising:
a memory that stores a security policy;
logic to determine whether a triggering criterion has occurred, where the triggering criterion comprises (i) a lapse of a predetermined time interval, and (ii) a predetermined number starts of the mobile device;
a transmitter to contact an authentication entity, when the triggering criterion has occurred, to determine whether a security status of the mobile terminal is one of lost or stolen;
logic to receive a response from the authentication entity indicating that the mobile terminal has been lost or stolen, in response to the transmitter contacting the authentication entity, the response comprising security instructions defining a command for execution on the mobile terminal, the command comprising an authentication procedure, transmitting a location of the mobile terminal to the authentication entity and subsequent to transmitting the location, rendering a portion of the mobile terminal inoperable;
upon determining the security status of the mobile terminal is one of lost or stolen, logic to execute, by the mobile terminal, performance of the authentication procedure by a user as defined by the command;
upon determining successful performance of the authentication procedure by the user of the mobile terminal:
logic to prevent the execution of (a) transmitting the location of the mobile terminal to the authentication entity and (b) rendering the portion of the mobile terminal inoperable for use; and
setting the security status of the mobile terminal to secure; and
upon determining unsuccessful performance of the authentication procedure by the user of the mobile terminal:
logic to transmit a Short Message Service (SMS) message to the authentication entity that includes the location of the mobile terminal, wherein the message is transmitted transparently with respect to the user of the mobile communication device and, subsequent to transmitting the message, render the portion of the mobile terminal inoperable.

18. The mobile terminal of claim 17, where the triggering criterion further includes one or more of includes a location of the terminal being outside a coverage area of the mobile terminal removal of a subscriber identity module (SIM) card associated with the mobile terminal, or updating a firmware or software associated with the mobile terminal.

19. The mobile terminal of claim 17, where, when contacting the authentication entity, the transmitter is to contact the authentication entity via a wireless network.

20. The mobile terminal of claim 17, where the authentication entity is associated with a carrier for the mobile terminal.

21. The mobile terminal of claim 17, where the authentication entity is associated with an owner of the mobile terminal.

22. The mobile terminal of claim 17, where the logic to execute a command further comprises:
    logic to perform one of: delete predetermined files on the mobile terminal, delete a predetermined folder on the mobile terminal, delete configuration settings on the mobile terminal, delete a particular file, of a plurality of files, on the mobile terminal, render the mobile terminal inoperable, lock the mobile terminal, or perform a reset of the mobile terminal.

23. A method comprising:
    maintaining, by an authentication entity, a security status associated with each of a plurality of mobile terminals;
    receiving, by the authentication entity, notice that a mobile terminal, of the plurality of mobile terminals, has been lost or stolen;
    receiving, by the authentication entity, contact from the mobile terminal to inquire about the security status of the mobile terminal, wherein the contact is received from the mobile terminal in response to occurrence of a predetermined event, wherein the predetermined event includes either one of (i) a lapse of a predetermined time interval, or (ii) a predetermined number starts of the mobile device; and
    in response to receiving the contact from the mobile terminal and determining that the security status of the mobile terminal is lost or stolen, transmitting, by the authentication entity, a response to the mobile terminal indicating that the security status of the mobile terminal is lost or stolen, the response comprising security instructions defining a security action for execution on the mobile terminal, the security action comprising an authentication procedure, transmitting a location of the mobile terminal to the authentication entity and, subsequent to transmitting the location, rendering a portion of the mobile terminal inoperable,
    wherein the mobile terminal:
        upon receiving the security status of the mobile terminal indicated as being lost or stolen, executes, by the mobile terminal, performance of the authentication procedure by a user as defined by the security action, and
        upon determining successful performance of the authentication procedure by the user of the mobile terminal:
            preventing execution of the security action based on the security status of the mobile terminal indicated as being lost or stolen of (a) transmitting the location of the mobile terminal to the authentication entity and (b) rendering the portion of the mobile terminal inoperable for use; and
            setting the security status of the mobile terminal to secure; and
        upon determining unsuccessful performance of the authentication procedure by the user of the mobile terminal, executes the security action based on the security status of the mobile terminal indicated as being lost or stolen, wherein executing the security action comprises transmitting a Short Message Service (SMS) message to the authentication entity that includes the location of the mobile terminal, wherein the message is transmitted transparently with respect to the user of the mobile communication device, and, subsequent to transmitting the message, rendering the portion of the mobile terminal inoperable.

24. The method of claim 23, where the security action further comprises:
    at least one of deleting a predetermined folder, of a plurality of folders, on the mobile terminal, deleting predetermined files on the mobile terminal, deleting configuration settings on the mobile terminal, locking the mobile terminal, rendering the mobile terminal inoperable, or performing a reset of the mobile terminal.

25. The method of claim 23,
    where receiving the notice that the mobile terminal has been lost or stolen comprises: receiving the notice, from an owner or a user of the mobile terminal and from a device that is different than the mobile terminal, that the mobile terminal has been lost or stolen, and
    where transmitting the response comprises: transmitting, based on the notice received from the owner or the user of the mobile terminal and to the mobile terminal, the response indicating that the security status of the mobile terminal is lost or stolen.

26. The method of claim 23, where transmitting the response to the mobile terminal comprises:
    retrieving the status of the mobile terminal from a plurality of statuses associated with a plurality of mobile terminals; and transmitting the retrieved status to the mobile terminal.

27. A security system comprising:
    an authentication entity comprising an application specific integrated circuit (ASIC) and configured to:
    maintain a security status for a mobile terminal connected to the authentication entity via a network,
    receive contact, from the mobile terminal, to inquire about the security status of the mobile terminal, wherein the contact is received from the mobile terminal in response to occurrence of a predetermined event, wherein the predetermined event includes either one of (i) a lapse of a predetermined time interval, or (ii) a predetermined number starts of the mobile device,
    determine whether the security status of the mobile terminal is lost or stolen, and
    in response to determining the security status of the mobile terminal is lost or stolen, transmit an indication of the security status as being lost or stolen to the mobile terminal, the indication comprising security instructions defining a security action for execution on the mobile terminal, the security action comprising an authentication procedure, transmitting a location of the mobile terminal to the authentication entity and, subsequent to transmitting the location, rendering a portion of the mobile terminal inoperable,
    wherein the mobile terminal:
    upon receiving the security status of the mobile terminal indicated as being lost or stolen, executes, by the mobile terminal, performance of the authentication procedure by a user as defined by the security action, and
    upon determining successful performance of the authentication procedure by the user of the mobile terminal:
        determines preventing execution of the security action based on the security status of the mobile terminal indicated as being lost or stolen of (a) transmitting the location of the mobile terminal to the authentication entity and (b) rendering the portion of the mobile terminal inoperable for use; and
    setting the security status of the mobile terminal to secure; and
    upon determining unsuccessful performance of the authentication procedure by the user of the mobile terminal, determines that the security action to be executed on the mobile terminal is transmitting the location of the mobile terminal to the authentication entity based on security status of the mobile terminal indicated as being lost or stolen and transmitting a Short Message Service (SMS) message to the authentication entity that includes the location of the mobile terminal, wherein the message is transmitted transparently with respect to the user of the mobile communication device and subsequent to transmitting the location, renders the portion of the mobile terminal inoperable.

28. The security system of claim 27, where the network is a cellular network.

29. The security system of claim 27, where the network is a data network.

30. The security system of claim 29, where the data network is one of: a 802.11 wireless data network (WiFi), a Bluetooth network, or a wireless universal serial bus (USB) network.

31. The security system of claim 27, where the authentication entity is further configured to:
   maintain a plurality of security statuses of a plurality of mobile terminals, the plurality of mobile terminals including the mobile terminal,
   where, when determining whether the security status of the mobile terminal is lost or stolen, the authentication entity is to retrieve the security status of the mobile terminal from the plurality of security statuses.

32. The security system of claim 31, where the plurality of security statuses are associated with a plurality of identification information of the plurality of mobile terminals,
   a particular security status, of the plurality of security statuses, being associated with a particular identification information, of the plurality of identification information, of a particular mobile terminal, of the plurality of mobile terminals,
   where, when determining whether the security status of the mobile terminal is lost or stolen, the authentication entity is to retrieve, based at least partially on identification information of the mobile terminal, the security status of the mobile terminal from the plurality of security statuses.

* * * * *